July 7, 1942. W. F. EAMES 2,289,107
BRAKE
Filed May 29, 1941 2 Sheets-Sheet 1

WITNESSES:

INVENTOR
William F. Eames.
BY
ATTORNEY

July 7, 1942.  W. F. EAMES  2,289,107
BRAKE
Filed May 29, 1941   2 Sheets-Sheet 2

WITNESSES:

INVENTOR
William F. Eames.
BY
ATTORNEY

Patented July 7, 1942

2,289,107

UNITED STATES PATENT OFFICE 2,289,107

BRAKE

William F. Eames, Westfield, N. J., assignor to Westinghouse Electric Elevator Company, Jersey City, N. J., a corporation of Illinois Application May 29, 1941, Serial No. 395,800

4 Claims. (Cl. 188—79.5)

My invention relates to improvements in brakes and more particularly to brakes of the electromechanical type in which the brake shoes are applied to the brake drum by springs and are released therefrom by electromagnetic means.

In electromagnetic brakes the amount of movement of the brake shoe into and out of engagement with its brake drum is small, and the smooth action of the brake depends very largely upon keeping this movement as small as possible. A magnet core movement of about $\frac{1}{16}''$ is desirable and this results in a movement of about .006 of an inch of the brake shoe toward and away from its drum. A small amount of brake lining wear will increase this clearance to a point where a large magnet core movement occurs which results in a rough braking action. Hence careful adjustment of the position of the brake shoe is required at intervals, often quite frequently shortly after the brake is first installed, until the lining wears to a seat and takes a permanent compression etc.

One object of my invention is to provide a brake which shall require no attention after it is installed except such attention as may be necessary to keep its parts clean and properly lubricated.

Another object is to provide a brake which will automatically so adjust its brake shoe operating mechanism as to maintain the clearance distance between the shoe and its drum at a predetermined value.

A further object is to provide a brake which shall require only an initial adjustment when it is installed and placed in operation.

A still further object is to provide a self-adjusting electromagnetic brake which shall be simple in operation and which shall be economical to manufacture, install and maintain in operation.

It is also an object to provide a brake which will make it practical to use softer brake linings which have better braking characteristics than the hard brake linings used at present.

Other objects of the invention will, in part, be obvious and will, in part, appear hereinafter.

For an illustration of one of the various forms my invention may take, reference may be had to the accompanying drawings in which.

Figure 1:
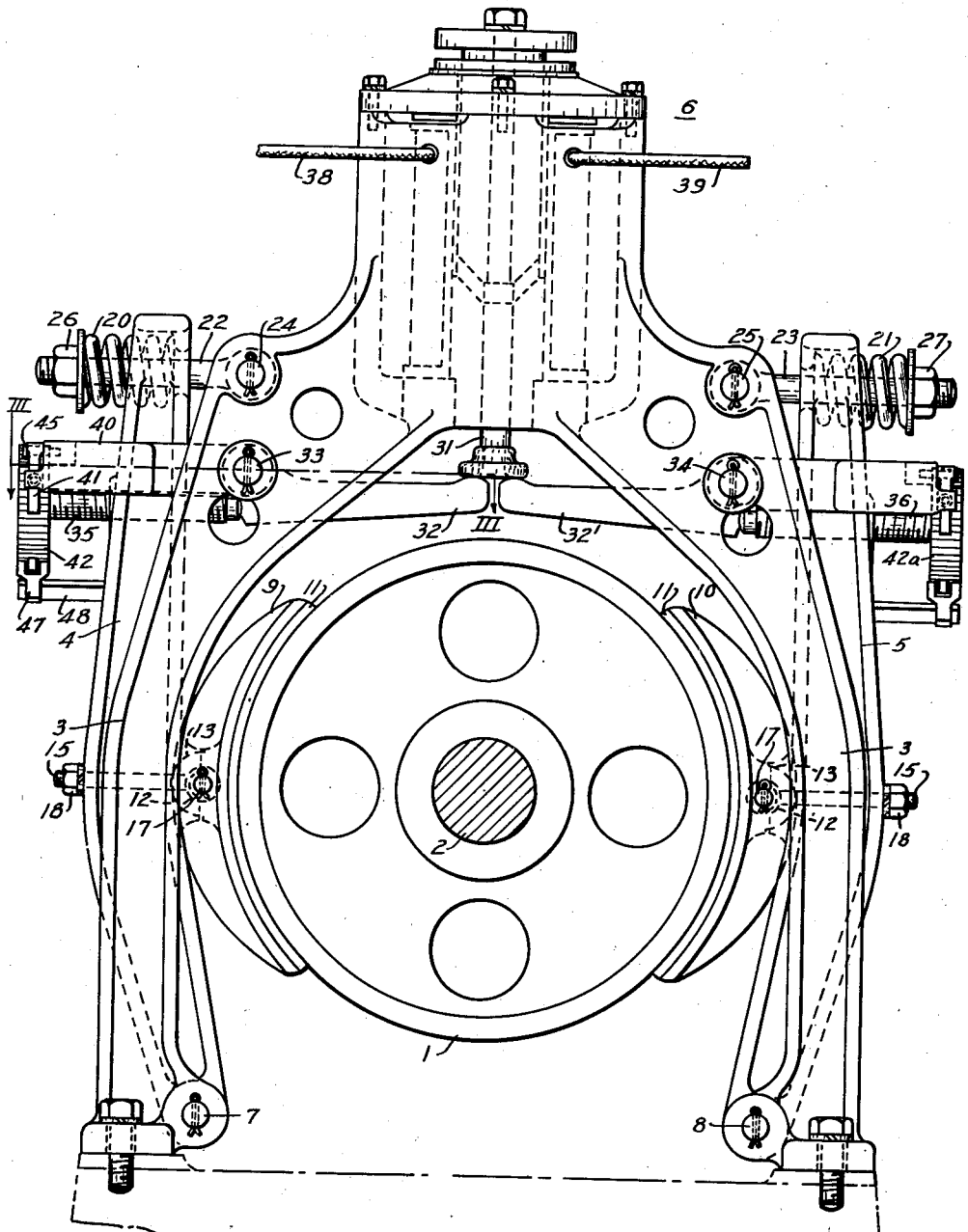
Figure 1 is a view, in end elevation, of a brake embodying my invention.
Figure 2:
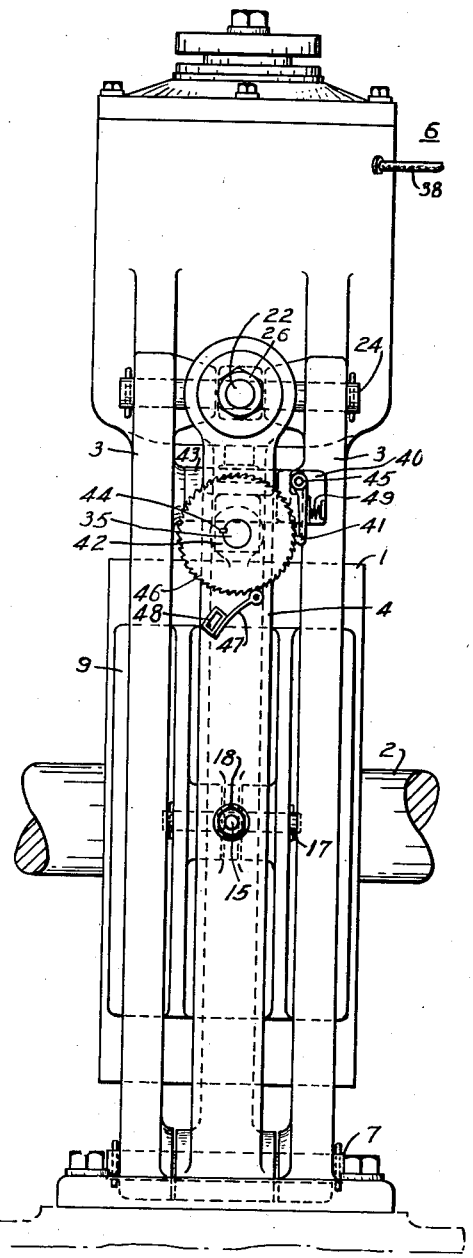
Fig. 2 is a view, in side elevation, of the brake illustrated in Fig. 1.
Figure 3:
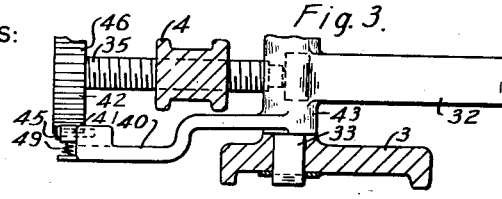
Fig. 3 is a view, in section, taken along the line III—III of Fig. 1.

In the drawings, I have illustrated a brake drum 1 as affixed to a driving shaft 2 to which a braking effect is to be applied. Surrounding the brake drum 1 is a yoke or frame 3 which carries and supports a pair of brake levers 4 and 5 and a power means such as an electromagnet 6 for operating the brake levers.

As shown, the brake levers 4 and 5 are disposed on opposite sides of the drum 1 with their lower ends pivotally connected by pivot pins 7 and 8 to the frame 3 and are provided with a pair of brake shoes 9 and 10 for engaging the brake drum 1. Each brake shoe is provided with a brake lining 11.

It will be noted that each of the brake shoes 9 and 10 is seated on its supporting brake lever by means of a universal joint in the form of a ball-and-socket connection comprising a ball 12 formed on the shoe and a socket 13 formed in the central portion of the lever. Each shoe is bolted to its supporting lever by means of an eye bolt 15, the inner end of which is secured in a slot in the ball portion of the shoe by pivot pin 17. As shown, the inner end of each eye bolt 15 is mounted on its pivot pin 17 in the shoe with sufficient play to permit the shoe to rotate, to a limited degree, in any direction. The outer end of each eye bolt 15 is provided with a nut 18 for drawing the bolt and shoe tightly against the brake lever, thereby causing the ball to be frictionally retained in the socket.

In view of the small area of the engaging surfaces of the ball-and-socket connection, as compared with the large areas of contact between the shoes and the drum, the shoes will be accurately alined with the drum the first time they are applied thereto by the brake, regardless of the degree to which the eye bolts may be tightened, and, by reason of the frictional engagement of the balls in the sockets, will retain their alinement when they are withdrawn from the drum. Inasmuch as the shoes are held tightly against the levers by the eye bolts under all conditions, no lost motion can occur between the shoes and the levers.

The means for applying the brake shoes 9 and 10 to the brake drum 1 comprises a pair of compression springs 20 and 21 which are mounted on the outer ends of a pair of eye bolts 22 and 23 secured to the frame 3 by a pair of pivot pins 24 and 25. The outer ends of these eye bolts are provided with a pair of nuts 26 and 27 by which the force applied by the springs 20 and 21 may be adjusted.

The electromagnet 6 for releasing the brake shoes is mounted on the upper central portion of the frame 3 and is suitably connected to the brake levers 4 and 5 to separate them against the force of the springs 20 and 21. As shown, the electromagnet 6 is provided with a movable armature 31, the lower end of which engages the inner arms of a pair of brake-operating bell-crank levers 32 and 32' which are pivotally mounted on a pair of pivot pins 33 and 34 in the upper part of the frame 3.

The bell-crank levers 32 and 32' are positioned in the frame 3 in such manner that their outer ends impinge against the inner ends of a pair of screw-threaded adjusting pins 35 and 36 mounted in the brake levers 4 and 5. When the electromagnet 6 is energized, its armature 31 moves downwardly against the inner ends of the levers 32 and 32' thus causing their outer ends to press against the inner ends of the limit pins and thereby force the brake arms 4 and 5 apart against the springs 20 and 21 to release the brake shoes from the brake drum.

The brake construction so far described constitutes the subject-matter of Patent No. 1,902,640, issued March 21, 1933, and assigned to Westinghouse Electric Elevator Company.

In electromechanical brakes of the type described, the brake linings and the various parts of the shoe operating mechanism are, of course, subject to wear and make it necessary to change the position of the adjusting pins from time to time so that a normal operation of the electromagnet will effect a normal operation of the brake. When the brake is first installed, the linings wear down more rapidly than they do later on and hence it is usually necessary to adjust the adjusting pins frequently during the first period of operation to maintain the brake in its most efficient operating condition. In order to avoid the necessity of repeatedly adjusting the brake after it is adjusted initially, I have provided a self-adjusting mechanism for each adjusting pin to maintain the brake shoes with a predetermined clearance when they are released from the brake drum.

The self-adjusting mechanism for the adjusting pin 35 comprises an adjusting arm 40, a pawl 41 and a ratchet wheel 42. The adjusting arm 40 is integral with the hub portion 43 of the operating lever 32 and disposed to extend outwardly in a direction opposite to the position of the lever 32. The ratchet wheel 42 is fixed on the outer end of the adjusting pin 35 by a key 44 in position to be engaged by the pawl 41 which is pivotally mounted by a pin 45 on the outer end of the adjusting arm 40. The ratchet wheel is provided with a plurality of ratchet teeth 46 on its outer periphery in position to be engaged by the pawl 41. The size of the ratchet teeth and the length of the arm 40 should be so designed that the normal motion of the operating arm 32 will impart such a motion to the arm 40 that the pawl will merely slide up and down along the surface of the ratchet tooth on which it is resting, but when the brake lining wears down sufficiently to permit the arm 32 to exceed its normal $\frac{1}{16}$ inch up stroke, the adjusting arm 40 will move the pawl downwardly sufficiently far to engage the next tooth on the ratchet wheel so that the next down stroke of the plunger will cause an up pull on the tooth, thereby rotating the ratchet wheel and consequently the adjusting pin on which the wheel is mounted. The axial length of the ratchet wheel should be greater than the width of the pawl so that the pawl will rest on the ratchet wheel regardless of reasonable axial movement of the adjusting pin.

A compression spring 49 may be disposed between the pawl and the lug on the outer end of the adjusting arm in position to bias the pawl against the ratchet wheel. A spring operated detent 47 is mounted on a projecting arm 48 attached to the brake arm 4 in position to bear against the ratchet teeth and thereby bias the ratchet wheel to remain in any position to which it is moved by the pawl 41. It should be noted that the pin 35 is provided with what is known as a right-hand thread so that it will be moved outwardly when the ratchet wheel is rotated by the pawl.

A similar adjusting mechanism is provided for the adjusting pin 36 on the other side of the brake, except that the pin 36 is provided with a left-hand screw-thread so that it will move outwardly when its ratchet wheel 42a is rotated by its pawl.

When the brake is installed the adjusting pins 35 and 36 are screwed into the brake arms to the position where the brake shoes will have the desired clearance when released from the brake drum. After this initial adjustment of the adjusting pins, the self-adjusting mechanism will maintain the clearance at the desired value.

In operation, the brake shoes 9 and 10 are normally held in engagement with the brake drum 1, by the compression springs 20 and 21. Assuming that it is desired to release the brake, then the conductors 38 and 39 leading to the electromagnet 6 are connected to a suitable source of electrical energy to energize the electromagnet. The energization of the electromagnet causes its armature plunger 31 to move downwardly against the inner ends of the bell-crank levers 32 and 32' and actuate them to press against the adjusting pins 35 and 36 mounted in the brake levers 4 and 5 and thereby move them outwardly, thus releasing the brake shoes 9 and 10 from the brake drum 1.

In normal operation, the brake magnet plunger 31 will move approximately $\frac{1}{16}$ of an inch and thereby cause the outer end of the adjusting arm 40 on the brake releasing lever to move about $\frac{3}{32}$ of an inch due to the lever arm ratio. Normally this $\frac{3}{32}$ of an inch motion will merely cause the pawl to slide up and down along the surface of the ratchet tooth against which it rests.

It will be assumed now that the brake shoe wears away sufficiently to permit the lever 4 and the pin 35 to move to the right under the effect of the spring 20 sufficiently to so operate the arm 32 that its free end moves upwardly more than its normal $\frac{1}{16}$ of an inch travel. The excessive upward movement of the arm 32 moves the adjusting arm 40 downwardly to such a degree that it engages the next lower tooth on the ratchet wheel. The next down power stroke of the plunger 31 operates the arm 32 to raise the adjusting arm 40 upwardly, thereby pulling upwardly on the pawl 41 and thus rotating the ratchet wheel 46 to screw the adjusting pin 35 outwardly a fraction of a turn. The outward adjustment of the pin 35 permits the spring 20 to bias the brake lever 4 closer toward the brake drum, thereby restoring the shoe-operating mechanism to the normal condition necessary to maintain the shoe with the predetermined clearance from its brake drum, so that it will clear the drum when the brake is released and effectively engage it when the brake is applied.

The operation of the pawl on the ratchet wheel will be repeated whenever the brake shoe clearance becomes greater than its normal amount, which is approximately .006 of an inch, and thus the brake shoes will be maintained in proper operating position at all times after their initial adjustment. The distances given for the movements of the plunger, the adjusting arm and the brake shoe are approximate and the mechanism may of course be designed for any suitable distances desired.

From the foregoing description, it will be seen that I have provided a simple self-adjusting mechanism for electromagnetic brakes which will cause them to remain in correct operating adjustment during the life of the brake lining. It will also be evident that the parts will remain properly adjusted whether the brake linings wear rapidly or slowly. Another advantage resulting from the self-adjusting mechanism is that my improvement makes it possible to use brake linings which have a much more rapid rate of wear than the present brake linings, but which have much better braking characteristics than the present brake linings.

Although I have illustrated and described only one specific embodiment of my invention, it is to be understood that modifications thereof and changes therein may be made without departing from the spirit and scope of the invention.

I claim as my invention:

1. A brake comprising a brake drum, a frame associated with the drum, a brake lever having its one end pivotally mounted on the frame, a brake shoe mounted on the central portion of the brake lever for engaging the drum, spring means for biasing the brake lever toward the drum, a screw-threaded adjusting pin threaded in the upper portion of the brake lever, an operating lever, means for pivotally mounting the operating lever on the frame, power means for moving the operating lever against the inner end of the adjusting pin to move the brake lever away from the drum, a ratchet wheel fixed on the outer end of the pin, a pawl for engaging the teeth of the ratchet wheel, and an arm fixed on the operating lever for moving the pawl to rotate the ratchet wheel when the operating arm moves beyond a predetermined distance whereby the pin is rotated to a position to compensate for wear on the brake.

2. A brake comprising a brake drum, a frame associated with said drum, a pair of brake levers pivotally mounted on said frame, a pair of brake shoes disposed on said levers for engaging said drum, a plurality of springs mounted on the frame and engaging the upper ends of said levers for actuating the levers independently into braking position, a pair of screw-threaded shafts disposed in the upper ends of the brake levers, a pair of operating levers for engaging the inner ends of the screw-threaded shafts to move the brake levers outwardly, power means for moving the inner ends of said operating levers to operate the brake levers, and means responsive to predetermined movement of said operating levers for rotating said screw-threaded shafts to adjust their positions in the brake levers to compensate for wear in the brake.

3. A brake comprising a brake drum, a frame associated with said drum, a pair of brake levers pivotally mounted on said frame, a pair of brake shoes disposed on said levers for engaging said drum, a plurality of springs mounted on the frame and engaging the upper ends of said levers for actuating the levers independently into braking position, a pair of screw-threaded shafts disposed in the upper ends of the brake levers, a pair of operating levers for engaging the inner ends of the screw-threaded shafts to move the brake levers outwardly, power means for moving the inner ends of said operating levers to operate the brake levers, a ratchet wheel fixed on each screw-threaded shaft, a pawl for each ratchet wheel, and an adjusting arm mounted on each operating lever for moving the pawl sufficiently to rotate the ratchet wheel and shaft when the operating lever exceeds a predetermined movement to compensate for wear in the brake.

4. A brake comprising a brake drum, a frame associated with the drum, a pair of brake levers pivotally mounted on the frame, a pair of brake shoes disposed on the brake levers for engaging the drum, resilient means for biasing the brake levers into braking position, a pair of screw-threaded shafts disposed in the brake levers, a pair of operating levers for engaging the screw-threaded shafts to move the brake levers outwardly, power means for moving the operating levers to operate the brake levers, and means responsive to a predetermined movement of the operating levers for rotating the screw-threaded shafts to adjust their positions in the brake levers to compensate for wear in the brake.

WILLIAM F. EAMES.